2,932,635
ALPHA-PEPTIDES OF LYSINE AND METHOD OF PREPARING SAME

Gaston Amiard, Noisy-le-Sec, René Heymes, Romainville, and Bernard Goffinet and Leon Velluz, Paris, France, assignors to UCLAF, Paris, France, a body corporate of France No Drawing. Application January 27, 1958
Serial No. 711,112

Claims priority, application France February 22, 1957

18 Claims. (Cl. 260—112)

This invention relates to a new method of preparing alpha-peptides of lysine, and to several novel peptides thus obtained.

The alpha-peptides of lysine which may be prepared in accordance with this invention have the general formula:

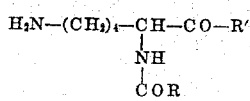

wherein R is the radical of an amino acid or of a peptide containing the linkage —CH(NH₂)—, and R' represents OH, —O— lower alkyl, the radical of an amino acid, or a peptide containing the linkage —NH—CH—(COOH).

The importance of lysine in the peptide linkage of numerous natural products is well known. Thus, it forms a linkage in corticotropine (see White and Landmann, J.A.C.S., 77, 1711 (1955); Choh Hao Li, Geschwind, Cole, Raacke, Harris, and Dixon, Nature, 176, 687 (1955)), in biocytine (see U.S. Patent 2,766,254), in certain peptides the structure of which resembles that of A.C.T.H. (see Boissonnas, Waller, and Jacquenod, Experientia, 12, 446 (1956)), and in vasopressine.

Investigators who have previously studied the problems connected with the synthesis of the alpha-peptides of lysine have found that the synthesis could be carried out by selectively blocking the ε-amino group in the carbobenzyloxylated form (cf. Bergmann, Zervas, and Ross, J. Biol. Chem., 111, 245 (1935)).

It is well known, however, that the protection of an amino group by benzyloxycarbonylation involves many difficulties, such as the use of reagents which must be prepared freshly and which require the utilization of phosgene.

It was, therefore, of importance to find a novel method of preparing alpha-peptides of lysine which would avoid the difficulties of previously known methods and which would enable the various peptides to be synthesized with improved efficiency and in higher yields.

In copending application Serial No. 527,634, filed August 10, 1955, a method was described for preparing N-tritylamino acids, and for their use in the preparation of the corresponding N-trityl peptides by conversion of the amino acid into a mixed anhydride, reaction of the mixed anhydrides with an amino acid or peptide ester, followed by saponification and detritylation. In copending application Serial No. 594,106, filed June 27, 1956, it was disclosed that N-tritylamino acids generally, could be readily converted into N-trityl peptides by reacting them with esters of amino acids or peptides in the presence of dicyclohexylcarbodiimide. This compound is a condensing agent recommended in the synthesis of peptides by Sheehan and Hess (see J.A.C.S., 77, 1066 (1955)) for other derivatives of amino acids. The esters of N-tritylated peptides thus obtained are converted to the free peptides by subsequent saponification, and detritylation by means of hot aqueous acetic acid.

We have now discovered that an alkyl N,N'-dirityllysinate can be readily detritylated in a selective manner at the alpha position to yield an alkyl ε-N-trityl lysinate, by refluxing with a mixture of 5 N hydrochloric acid and acetone. The alkyl ε-N-trityl lysinate thus produced is adapted to peptide condensation at the alpha position in accordance with the methods disclosed in copending applications Ser. Nos. 527,634 and 594,106. The alpha-peptide of tritylated alkyl lysinate thus obtained is saponified, and then detritylated by acid treatment so as to furnish the desired alpha-peptide of lysine.

The production of the alkyl ε-trityl lysinate in a single step from the corresponding alkyl N,N'-ditrityl lysinate constitutes a noteworthy technical advance, since, by comparison, the preparation of methyl ε-carbobenzyloxy lysinate from methyl N,N'-dicarbobenzyloxy lysinate (Bergmann, Zervas, and Ross, loc. cit.) requires five steps. It could not have been predicted, in the light of present knowledge of tritylation, that a selective detritylation would take place at the alpha position, under the conditions determined by the present invention.

It is, therefore, an object of this invention to provide a new method of preparing peptides, which are of great importance in nutrition and in protein research.

In accordance with this invention there may be prepared not only novel tritylated derivatives of lysine and lysine esters, but tritylated alpha-peptides, and lysine peptides obtainable therefrom, such as new derivatives of glutamic acid. The trityl halide is recoverable in almost quantitative yields upon detritylation in accordance with our new method.

In carrying out the novel process of this invention, the alpha-peptides of lysine are prepared by treating a lower alkyl lysinate such as methyl lysinate with a trityl halide such as trityl chloride, in a suitable solvent, in the presence of an alkaline agent such as triethylamine, capable of combining with hydrogen halides liberated. The alkyl N,N'-ditrityl lysinate thus formed is separated, and treated at a temperature close to reflux with a mixture of an acid such as hydrochloric acid and a suitable organic solvent, such as, for example, acetone, to form the alkyl ε-N-trityl lysinate, which is isolated. The latter is reacted with a suitably substituted amino acid to obtain the tritylated alpha-peptide of lysine, in accordance with methods described in the aforementioned copending applications. The tritylated peptide is saponified and then detritylated in an acid medium in accordance with conventional methods.

According to a preferred embodiment of the process of the invention, the lower alkyl lysinate used is methyl lysinate, ditritylation is carried out in chloroform, detritylation is then done selectively at the α-position by a 5 N hydrochloric acid in acetone in the presence of triethylamine. The methyl ε-N-trityl lysinate is then reacted in chloroform with an N-trityl amino acid or peptide in the presence of dicyclohexylcarbodiimide, is saponified, the tritylated α-peptide of lysine produced is isolated and is heated on reflux of aqueous acetic acid for the purpose of its detritylation.

If it is desired to prepare a polypeptide of lysine, wherein the amino group at the α-position and the carboxyl of lysine are utilized, and thereby to effect a linking that often occurs in the natural polypeptides of lysine, it is not necessary to prepare first α-peptide as indicated above and then to react the carboxyl of the latter with a suitably substituted amino acid. We have found that the selective detritylation of the α-position, which has been mentioned above in connection with alkyl N,N'-ditrityl lysinates, takes place equally well with N,N'-ditrityl-lysylpeptides. The preparation of an α-peptide derivative of a lysyl-peptide will thus consist in treating alkyl N,N'-ditrityl lysinate on reflux of a potassium hydroxide solution in propylene-glycol, in isolating the N,N'-ditrityl-lysine which is reacted with an ester of an amino acid or peptide in the presence of dicyclohexylcarbodiimide according to known methods, and in isolating the N,N'-ditrityl lysyl peptide ester which is selectively detritylated at the α-position as indicated above. The ε-N-trityl lysyl peptide ester produced is then caused to react, according to known methods, with a suitably substituted amino acid, and is saponified. The tritylated α-peptide of lysyl peptide is isolated and is then detritylated in an acid medium as described above.

The different newly described intermediate products also form a part of this invention. They can be used in the synthesis of different α-peptides of lysine.

The following equations serve to illustrate the process of the present invention:

The examples which follow serve to illustrate the invention without however limiting its scope. The method of operating previously described may, of course, be used when starting from racemic amino acids or from enantiomorphous substances. It is possible to change the nature of the solvents, the condensing agents, the temperatures and the length of reaction within the scope of the invention. The melting points have been determined on the Maquenne block.

EXAMPLE 1

*Preparation of methyl N,N'-ditrityl DL-lysinate*

(Formula II, $R_1=-CH_3$)

4.7 g. of methyl DL-lysinate dihydrochloride, Formula I, are suspended in 100 cc. of chloroform and chilled

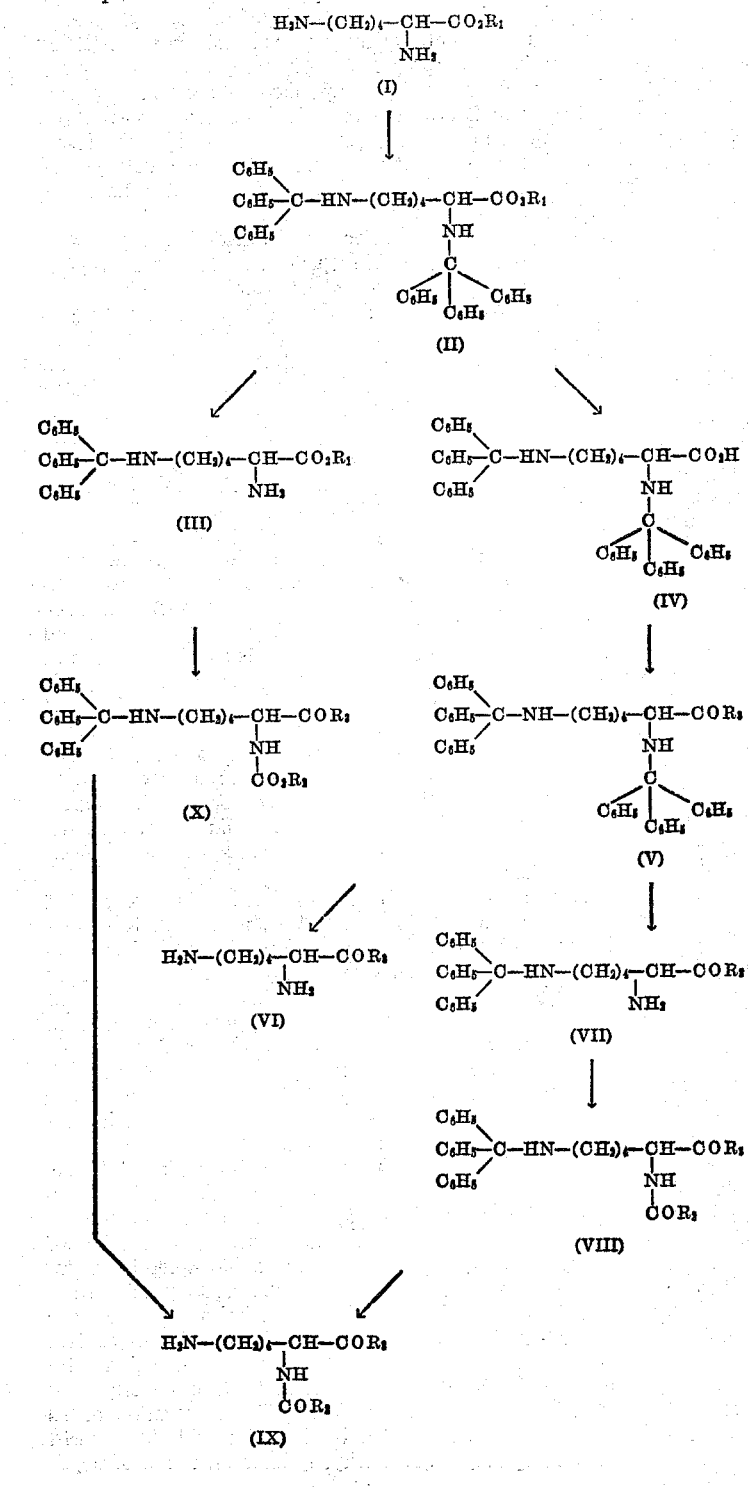

to 0° C., whereupon 20 cc. of triethylamine and then 14 g. of trityl chloride are added. The solution is stirred for two hours at room temperature, separated, washed with water, dried over magnesium sulfate and evaporated to dryness in vacuo. The residue is taken up with 10 cc. of ether; 75 cc. of methanol are added, the solution is chilled at 0° C. for one hour, is separated (centrifuged), and the precipitate is washed with methanol. There is obtained 11.2 g. (87%) of methyl N,N'-ditrityl DL-lysinate, M.P.=149–150° C. The product, which has not been previously described, is in the form of small colorless prisms, soluble in benzene and chloroform, soluble when hot in acetone, difficulty soluble in alcohol and in ether.

*Analysis.*—$C_{45}H_{44}O_2N_2$=644.82. Calculated: C percent, 83.81; H percent, 6.88; O percent, 4.96; N percent, 4.34. Found: C percent, 83.6; H percent, 6.8; O percent, 5.5; N percent, 4.4.

EXAMPLE 2

*Preparation of methyl N,N'-ditrityl L-lysinate*

(Formula II, $R_1$=—$CH_3$)

Starting from methyl L-lysinate dihydrochloride, the method described in Example 1 is followed and produces methyl N,N'-ditrityl L-lysinate with a yield of 90%.

EXAMPLE 3

*Preparation of methyl ε-N-trityl DL-lysinate*

(Formula III, $R_1$=—$CH_3$)

10 g. of methyl N,N'-ditrityl DL-lysinate (Formula II, $R_1$=$CH_3$) prepared according to Example 1, are introduced into a mixture of 60 cc. of acetone and 15 cc. of 5 N hydrochloric acid, the solution is refluxed for one hour, evaporated to dryness in vacuo at a temperature of less than 50° C. and is taken up with 50 cc. of chloroform. The solution thus obtained is dried over magnesium sulfate, concentrated to 10 cc. and 100 cc. of ether are added. The precipitate (6.5 g. of crude methyl ε-N-trityl DL-lysinate dihydrochloride, M.P. about 140° C.) is centrifugally separated, suspended in ether, and treated with a saturated solution of sodium bicarbonate. The ether phase is separated, filtered and evaporated to dryness in vacuo which produces methyl ε-N-trityl DL-lysinate (Formula III, $R_1$=$CH_3$) with a yield of 50%.

The product takes the form of a colorless oil, soluble in alchol, ether, acetone, benzene and choloroform, insoluble in water. It has not been previously described.

EXAMPLE 4

*Preparation of methyl ε-N-trityl L-lysinate*

(Formula III, $R_1$=—$CH_3$)

Starting from methyl N,N'-ditrityl L-lysinate (Formula II, $R_1$=—$CH_3$) prepared according to Example 2, the method of preceding Example 3 is followed. This produces methyl ε-N-trityl L-lysinate (Formula III, $R_1$=—$CH_3$)

with a yield of 50%. The product takes the form of a colorless oil. It has not been described in the past.

EXAMPLE 5

*Preparation of ε-N-trityl L-lysine*

(Formula III, $R_1$=H)

5 g. of crude dihydrochloride of methyl ε-N-trityl L-lysinate (Formula III, $R_1$=—$CH_3$) prepared according to Example 4 are introduced into 50 cc. of N sodium hydroxide and heated under reflux for 5 minutes. It is chilled to 0° C., acidified with N hydrochloric acid to pH 2, filtered and treated with ammonia until the pH is 10. It is iced, separated (centrifuged), and the precipitate is washed with water and recrystallized from 40% alcohol, thereby producing 3 g. (75%) of ε-N-trityl L-lysine, M.P.=about 230° C., $[\alpha]_D^{20}$=+9° C.±2 (c.=2%, N hydrochloric acid).

This product, which is new, takes the form of small colorless needles, insoluble in water, alcohol, ether, acetone, benzene and chloroform.

*Analysis.*—$C_{25}H_{28}O_2N_2$=388.49. Calculated: C percent, 77.29; H percent, 7.27; N percent, 7.21. Found: C percent, 76.8; H percent, 7.2; N percent, 7.1.

EXAMPLE 6

*Preparation of α-glycyl L-lysine*

(Formula IX, $R_2$=—$CH_2$—$NH_2$, $R_3$=OH)

(a) PREPARATION OF α-TRITYL GLYCYL ε-TRITYL L-LYSINE (FORMULA X), $R_2$=—$CH_2$—$NH$—$C(C_6H_5)_3$, $R_3$=OH 3.5 g. of methyl ε-N-trityl L-lysinate (Formula III, $R_1$=$CH_3$) prepared according to Example 4, are dissolved in 50 cc. of chloroform. There is added thereto a solution, which has first been stirred, washed with water and dried, consisting of 3.5 g. of diethylamine salt of N-trityl glycine in 25 cc. of chloroform, 25 cc. of water and 9.3 cc. of N hydrochloric acid and then the whole is concentrated to a volume of 50 cc.

2.2 g. of dicyclohexylcarbodiimide are added, and the solution is left to stand at room temperature for two hours. After 0.5 cc. of acetic acid has been added and the solution has been left undisturbed for 15 minutes, it is filtered, washed with water, dried over magnesium sulfate and evaporated to dryness in vacuo. The residue is taken up with 20 cc. of ether, 1 cc. of diethylamine is added, it is iced, filtered and evaporated to dryness in vacuo. The oily residue is taken up with 40 cc. of ethanol and is heated on reflux whereupon 20 cc. of N sodium hydroxide are added. It is then heated on reflux for another three minutes, iced, centrifuged, and washed with ice water. The precipitate is again dissolved in 30 cc. of chloroform; the chloroform solution is acidified with 3 cc. of acetic acid, is washed with water, is dried over magnesium sulfate and is evaporated to dryness in vacuo. The residue is taken up with 20 cc. of ether, is iced, centrifuged and washed with ether thereby producing 4.3 g. (63%) of α-trityl glycyl ε-trityl L-lysine, (Formula X, $R_2$=—$CH_2$—$NH$—$C(C_6H_5)_3$, $R_3$=OH), M.P.=130° C., $[\alpha]_D^{20}$=+22° C.±2 (c.=2%, chloroform). This product, which has not been previously described, takes the form of small colorless needles, soluble in alcohol, acetone and chloroform, little soluble in benzene, insoluble in water and ether.

*Analysis.*—$C_{46}H_{45}N_3O_3$=687.84. Calculated: C percent, 80.32; H percent, 6.59; O percent, 6.98; N percent, 6.11. Found: C percent, 79.7; H percent, 6.8; O percent, 6.8; N percent, 5.8.

(b) PREPARATION OF α-GLYCYL L-LYSINE MONOHYDROCHLORIDE (FORMULA IX, $R_2$=—$CH_2$—$NH_2$, $R_3$=OH)

2 g. of α-trityl glycyl ε-trityl lysine prepared according to the preceding paragraph (a)

(Formula X, $R_2$=—$CH_2$—$NH$—$C(C_6H_5)_3$, $R_3$=OH)

are heated for five minutes under reflux in a mixture consisting of 10 cc. of acetic acid, 10 cc. of water and 3 cc. of N hydrochloric acid. This is iced and filtered, and the filtrate is evaporated to dryness. The residue is taken up with 10 cc. of methanol; 20 cc. of ethanol are added, the precipitate is centrifuged, is washed with ethanol and then with ether and is dried in vacuo, thereby producing 0.55 g. (80%) of α-glycyl L-lysine monohydrochloride, $[\alpha]_D^{20}$ (restored to peptide base) =

$-13°$ C.±2 (c.=2%, 0.5 N hydrochloric acid)

The product takes the form of a very hygroscopic white powder, soluble in water, insoluble in alcohol ether, acetone, benzene and chloroform, fairly soluble in methanol.

EXAMPLE 7

*Preparation of α-L-lysyl L-lysine*

(Formula IX, $R_2$=—CH($NH_2$)—($CH_2$)$_4$—$NH_2$, $R_3$=OH)

(a) PREPARATION OF DIETHYLAMINE SALT OF N,N'-DITRITYL L-LYSINE (FORMULA IV)

3.2 g. of methyl N,N'-ditrityl L-lysinate (Formula II, $R_1$=—$CH_3$) prepared according to Example 2, are introduced into a mixture of 25 cc. of propylene glycol and 5 cc. of xylene and are refluxed for three minutes until completely dissolved. 20 cc. of a 20% potassium hydroxide solution in propylene glycol and 5 cc. of xylene are added, and reflux is continued for five minutes. 100 cc. of ice water are added, the solution is chilled to 0° C. and neutralized with 5 cc. of acetic acid. The resulting precipitate is extracted with 50, 20 and 20 cc. of chloroform; the chloroform solution is washed with water, is dried over magnesium sulfate, and there is added 2 cc. of diethylamine. This is evaporated to dryness and taken up with 30 cc. of ether, centrifuged and washed with ether, thereby producing 2.65 g. (75%) of diethylamine salt of N,N'-ditrityl L-lysine, M.P.=about 150° C., $[\alpha]_D^{20}$=+23°+1 (c.=2%, chloroform). This product which has not been previously described, takes the form of small colorless prisms, insoluble in water and ether, soluble in alcohol and chloroform. For analysis this product is recrystallized from methylethyl ketone.

*Analysis.*—$C_{48}H_{53}O_2N_3$=703.92. Calculated: C percent, 81.89; H percent, 7.59; N percent, 5.97. Found: C percent, 82.0; H percent, 7.5; N percent, 5.8.

(b) PREPARATION OF α-L-LYSYL L-LYSINE (FORMULA IX, $R_2$=—CH($NH_2$)—($CH_2$)$_4$—$NH_2$, $R_3$=OH)

3.6 g. of the diethylamine salt of N,N'-ditrityl L-lysine produced according to the preceding paragraph (a) and 2.5 g. of methyl ε-N-trityl L-lysinate dihydrochloride prepared according to Example 4 are dissolved in 25 cc. of methylene chloride, 0.7 cc. of triethylamine is added and then, 1.15 g. of dicyclohexylcarbodiimide; the solution is allowed to stand for three hours at room temperature. 0.5 cc. of acetic acid is added, the solution is allowed to stand for 15 minutes, filtered, the filtrate is washed with water, dried over magnesium sulfate, and evaporated to dryness in vacuo. The residue is taken up with 20 cc. of ether. 40 cc. of alcohol are added, the mixture is heated under reflux, and 15 cc. of N sodium hydroxide are gradually introduced into the mixture. The ether is eliminated in vacuo, the aqueous residue is heated for three minutes on reflux, is iced, 50 cc. of water are added, then, 3 cc. of acetic acid, and extraction is carried out with chloroform. The chloroform extracts are washed with water, dried over magnesium sulfate, and evaporated to dryness in vacuo. The residue is treated under reflux with 20 cc. of 50% acetic acid for five minutes; it is iced and filtered, and the filtrate is evaporated to dryness in vacuo. The resulting oily residue is treated under reflux with a solution of 3.6 g. of flavianic acid in 25 cc. of 80% alcohol. The solution is allowed to cool, and the α-lysyl L-lysine diflavianate is separated (centrifuged).

The product takes the form of orange prisms, M.P.=210° C.

*Analysis.*—$C_{32}H_{38}O_{19}N_8S_2$=902.85. Calculated: C percent, 42.57; H percent, 4.24; N percent, 12.41; S percent, 7.10. Found: C percent, 42.6; H percent, 4.3; N percent, 12.0; S percent, 7.4.

EXAMPLE 8

*Preparation of α-glycyl L-lysyl L-glutamic acid Formula IX, $R_2$=—$CH_2NH_2$, $R_3$=—NH—CH($CO_2H$)—($CH_2$)$_2$—$CO_2H$)*

(a) PREPARATION OF DIETHYL ε-N-TRITYL L-LYSYL L-GLUTAMATE (FORMULA VII, $R_3$=—NH—CH($CO_2C_2H_5$)—($CH_2$)$_2$—$CO_2C_2H_5$)

22.5 g. of diethylamine salt of N,N'-ditrityl L-lysine prepared according to Example 7(a) and 8 g. of hydrochloride of diethyl L-glutamate are dissolved in 150 cc. of methylene chloride, 6.8 g. of dicyclohexylcarbodiimide are added, and the solution is allowed to stand at room temperature for 2 hours. 1 cc. of acetic acid is added, after a quarter of an hour the solution is filtered, the filtrate is washed with water and is dried over magnesium sulfate, 2 cc. of diethylamine are added, and evaporation to dryness is carried out in vacuo. The residue is taken up with 200 cc. of acetone, 50 cc. of 5 N hydrochloric acid are added, and the mixture is allowed to stand 15 minutes at 35° C. The solution is concentrated in vacuo to 100 cc., 100 cc. of water are added, and extraction is carried out three times with chloroform, each time with 100 cc. The combined chloroform extracts are dried over magnesium sulfate and evaporated to dryness in vacuo. The oily residue is taken up with 200 cc. of ether. Separation (centrifuging) produces 13.25 g. (77%) of diethyl ε-N-trityl L-lysyl L-glutamate (dihydrochloride).

This product, which is new, takes the form of a colorless and hygroscopic powder, which decomposes at about 120° C. and melts at about 150° C. $[\alpha]_D^{20}$=+5° C.±2(c.=2%, chloroform).

(b) PREPARATION OF α-TRITYLGLYCYL ε-N-TRITYL L-LYSYL L-GLUTAMIC ACID (FORMULA VIII, $R_2$=—$CH_2$—$NH_2$, $R_3$=—NH—CH($CO_2H$)—($CH_2$)$_2$—$CO_2H$)

6 g. of N-trityl glycine diethylamine salt are dissolved in 50 cc. of chloroform, whereupon 50 cc. of water and then 15.3 cc. of N hydrochloric acid are added; the solution is stirred, washed with water until neutral and dried over magnesium sulfate whereby a first solution A is obtained. 9.5 g. of diethyl ε-N-trityl L-lysyl L-glutamate dihydrochloride, prepared according to the preceding example, are dissolved in 50 cc. of chloroform. This is washed with bicarbonate, then with water, and is dried over magnesium sulfate, whereby solution B is obtained.

Solutions A and B are combined and concentrated to 80 cc. at a temperature below 20° C. 3 g. of dicyclohexylcarbodiimide are added, and the solution is allowed to stand at room temperature for two hours. 1 cc. of acetic acid are added; after 15 minutes the dicyclohexylurea is filtered off. The filtrate is washed with water, dried over magnesium sulfate, 3 cc. of diethylamine are added, and evaporated to dryness. The residue is taken up with 50 cc. of ether, is filtered and evaporated to dryness. The oil thus obtained is taken up by reflux in 60 cc. of alcohol. The solution obtained is gradually increased, on reflux, by 50 cc. of N sodium hydroxide. It is iced, separated (centrifuged), washed with 50% alcohol, taken up with 100 cc. of chloroform, washed with 100 cc. of 10% acetic acid, with water, is dried over magnesium sulfate and concentrated to small volume in vacuo. After 100 cc. of ether have been added, the solution is iced, separated (centrifuged) and dried in vacuo thereby producing 5.5 g. of α-trityl-glycyl ε-N-trityl L-lysyl L-glutamic acid, M.P.=130–140° C., $[\alpha]_D^{20}$=+47° C.±2(c.=2%, chloroform), or a yield of 48% in relation to the diethyl ε-N-trityl L-lysyl L-glutamate utilized.

The product takes the form of an amorphous, colorless powder, insoluble in water and ether, soluble in alcohol, acetone, benzene and chloroform. This product has not been previously described in the literature.

*Analysis.*—$C_{51}H_{52}O_6N_4 = 816.96$. Calculated: C percent, 74.98; H percent, 6.42; O percent, 11.75; N percent, 6.86. Found: C percent, 75.3; H percent, 6.4; O percent, 11.0; N percent, 6.8.

(c) PREPARATION OF α-GLYCYL L-LYSYL L-GLUTAMIC ACID 3 g. of α-trityl-glycyl ε-N-trityl L-lysyl L-glutamic acid prepared according to the preceding paragraph are heated for 5 minutes under reflux with a mixture of 10 cc. of acetic acid and 10 cc. of double-distilled water. 10 cc. of water are added; the solution is iced, filtered and evaporated to dryness in vacuo. The residue is taken up with 20 cc. of alcohol, iced, separated (centrifuged) and the crystallizate is washed with alcohol, then with ether, thereby producing 1.1 g. (91%) of α-glycyl L-lysyl L-glutamic acid, M.P.=295–300° C., $[\alpha]_D^{20} = -33°$ C.±2 (c.=1%, water).

This product, which is new, takes the form of small colorless needles, soluble in water, insoluble in alcohol, ether, acetone, benzene and chloroform.

*Analysis.*—$C_{13}H_{24}O_6H_4\cdot\frac{1}{4}H_2O = 336.85$. Calculated: C percent, 46.35; H percent, 7.33; O percent, 29.69; N percent, 16.63. Found: C percent, 46.4; H percent, 7.2; O percent, 29.8; N percent, 16.3.

We claim:

1. In a process of producing α-peptides of lysine, the steps which comprise adding trityl chloride to a lower alkyl lysinate, allowing the mixture to stand at room temperature until tritylation is completed, heating under reflux the resulting N,N-ditrityl lower alkyl lysinate with a mixture of acetone and hydrochloric acid to cause selective detritylation, allowing a mixture of the resulting ε-N-trityl lower alkyl lysinate and an N-trityl-α-amino carboxylic acid to stand at room temperature with the addition of dicyclohexyl carbodiimide to cause condensation of said lysinate and said α-amino carboxylic acid, said α-amino carboxylic acid being a naturally occurring α-amino carboxylic acid heating under reflux the resulting tritylated peptide lower alkyl ester with alcoholic sodium hydroxide solution to cause saponification of the lower alkyl ester group, and heating under reflux the resulting tritylated peptide with about 50% acetic acid to cause complete detritylation.

2. The method of claim 1 in which the alkyl lysinate is methyl lysinate.

3. The method of claim 1 in which the trityl halide is trityl chloride.

4. In a process of producing α-peptides of lysine, said α-peptides being peptides of naturally occurring α-amino carboxylic acids, the steps which comprise heating under reflux a lower alkyl ester of N,N′-ditrityl lysine with a mixture of about 5 N hydrochloric acid and acetone to cause selective detritylation, allowing a mixture of the resulting lower alkyl ester of ε-N-trityl lysine and an N-trityl-α-amino carboxylic acid to stand at room temperature with the addition of dicyclohexyl carbodiimide to cause condensation of said alkyl ester of ε-N-trityl lysine with said N-trityl-α-amino carboxylic acid, said α-amino carboxylic acid being a naturally occurring α-amino carboxylic acid heating under reflux the resulting tritylated α-lysine peptide lower alkyl ester with alcoholic sodium hydroxide solution to cause saponification of the lower alkyl ester group, and heating under reflux the resulting tritylated α-lysine peptide with about 50% acetic acid to cause complete detritylation.

5. In a process of producing a lower alkyl ε-N-trityl lysinate, the step which comprises heating under reflux a lower alkyl N,N′-ditrityl lysinate with about 5 N hydrochloric acid and acetone to cause selective detritylation to the lower alkyl ε-N-trityl lysinate.

6. In a method of producing an α-peptide of lysine, said α-peptide being a peptide of naturally occurring α-amino carboxylic acids, the steps which comprise allowing a mixture of a lower alkyl ester of ε-N-trityl lysine and an N-trityl amino compound selected from the group consisting of an N-trityl-α-amino carboxylic acid and a peptide thereof, said α-amino carboxylic acid being a naturally occurring α-amino carboxylic acid and said peptide being a peptide of naturally occurring α-amino carboxylic acids, in solution in chloroform to stand at room temperature with the addition of dicyclohexyl carbodiimide to cause condensation of said alkyl ester of ε-N-trityl lysine with said N-trityl amino compound, heating under reflux the resulting tritylated α-lysine peptide lower alkyl ester with alcoholic sodium hydroxide solution to cause saponification of the lower alkyl ester group, and heating under reflux the resulting tritylated α-lysine peptide with about 50% acetic acid to cause complete detritylation.

7. In a method of producing an α-peptide of lysyl peptide, said peptides being peptides of naturally occurring α-amino carboxylic acids, the steps which comprise heating under reflux a lower alkyl ester of N,N′-ditrityl lysine with a solution of potassium hydroxide in propylene glycol, allowing a mixture of the resulting N,N′-ditrityl lysine and an amino compound selected from the group consisting of an α-amino carboxylic acid lower alkyl ester and a peptide lower alkyl ester thereof, said α-amino carboxylic acid being a naturally occurring α-amino carboxylic acid and said peptide being a peptide of naturally occurring α-amino carboxylic acids, to stand at room temperature with the addition of dicyclohexyl carbodiimide to cause condensation of said N,N′-ditrityl lysine and said amino compound, heating under reflux the resulting N,N′-ditrityl lysyl peptide lower alkyl ester with a mixture of acetone and hydrochloric acid to cause selective detritylation, allowing a mixture of the resulting ε-N-trityl lysyl peptide lower alkyl ester and an N-trityl-α-amino carboxylic acid to stand at room temperature with the addition of dicyclohexyl carbodiimide to cause condensation of said tritylated lysyl peptide lower alkyl ester with said N-trityl-α-amino carboxylic acid, heating under reflux the resulting tritylated peptide lower alkyl ester with an alcoholic sodium hydroxide solution to cause saponification of the lower alkyl ester group, and heating under reflux the resulting tritylated peptide with about 50% acetic acid to cause complete detritylation.

8. An α-peptide compound of lysine of the formula

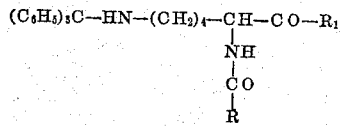

wherein:

R is a member selected from the group consisting of an N-trityl-α-amino carboxylic acid and an N-trityl peptide, said α-amino carboxylic acid being a naturally occurring α-amino carboxylic acid and said peptide being a peptide of naturally occurring α-amino carboxylic acids, and $R_1$ is a member selected from the group consisting of the hydroxyl group, the lower alkoxy group, the radical of an α-amino carboxylic acid, and the radical of a peptide, said α-amino carboxylic acid being a naturally occurring α-amino carboxylic acid and said peptide being a peptide of naturally occurring α-amino carboxylic acids.

9. Methyl ε-N-trityl DL-lysinate.
10. Methyl ε-N-trityl L-lysinate.
11. ε-N-trityl L-lysine.
12. α-Tritylglycyl-ε-trityl L-lysine.
13. Methyl N,N'-ditrityl DL-lysinate.
14. Methyl N,N'-ditrityl L-lysinate.
15. N,N'-ditrityl L-lysine.
16. Diethyl ε-N-trityl L-lysyl L-glutamate.
17. α-Trityl-glycyl ε-N-trityl L-lysyl L-glutamic acid.
18. α-Glycyl L-lysyl L-glutamic acid.

References Cited in the file of this patent

Anson: Advances in Protein Chemistry, vol. V, 1949, pp. 58–62, Academic Press Inc., New York, N.Y.

Amiard et al.: Bull. Soc. Chim. France (1956), page 698, vol. 23.

Schwyzer et al.: Helv. Chim. Acta (1957), vol. 40, page 639.

Amiard et al.: Bull. Soc. Chim. France (1957), vol. 24, pp. 1133–36.